US007221776B2

(12) United States Patent
Xiong

(10) Patent No.: US 7,221,776 B2
(45) Date of Patent: May 22, 2007

(54) VIDEO STABILIZER

(75) Inventor: Wei Xiong, Fremont, CA (US)

(73) Assignee: ArcSoft, Inc., Fremont, CA (US)

( * ) Notice: Subject to any disclaimer, the term of this patent is extended or adjusted under 35 U.S.C. 154(b) by 359 days.

(21) Appl. No.: 10/003,329

(22) Filed: Oct. 31, 2001

(65) Prior Publication Data

US 2003/0090593 A1 May 15, 2003

(51) Int. Cl.
*G06K 9/00* (2006.01)

(52) U.S. Cl. ...................... 382/103; 382/107
(58) Field of Classification Search ............... 382/219, 382/220, 276, 278, 296–299, 260–266; 345/649, 345/672, 648, 654; 348/208.99, 208.1–208.4
See application file for complete search history.

(56) References Cited

U.S. PATENT DOCUMENTS

| | | | | |
|---|---|---|---|---|
| 5,963,675 A | * | 10/1999 | van der Wal et al. | 382/260 |
| 6,459,822 B1 | * | 10/2002 | Hathaway et al. | 382/296 |
| 6,567,564 B1 | * | 5/2003 | van der Wal | 382/260 |
| 6,636,220 B1 | * | 10/2003 | Szeliski et al. | 345/475 |

OTHER PUBLICATIONS

Tommasini et al., "Making Good Features Track Better," pp. 1-6.
Gouet et al., "A Fast Matching Method for Color Uncalibrated Images Using Differential Invariants", British Machine Vision Conference, pp. 368-376.
Foley et al., *Computer Graphics Principles and Practice*, Second Edition, Nov. 1992, p. 207.
Jain, Anil K., *Fundamentals of Digital Image Processing*, 1989, p. 362.
Gonzalez et al., *Digital Image Processing*, Sep. 1993, pp. 423-439.
Zhang et al., "A Robust Technique for Matching Two Uncalibrated Images Through the Recovery of the Unknown Epipolar Geometry," No. 2273, Institut National de Recherche en Informatique et en Automatique, May 1994, pp. 3-38.
Zhu et al., "Camera Stabilization Based on 2.5D Motion Estimation and Inertial Motion Filtering", 1998 IEEE International Conference on Intelligent Vehicles, pp. 329-334.
Durić et al., "Stabilization of Image Sequences", Jul. 1995, pp. 1-47.
Balakirsky et al., "Performance Characterization of Image Stabilization Algorithms", Apr. 1996, pp. 1-29.
"Feature Point Extraction," downloaded from http://www.esat.kuleuven.ac.be/~pollefey/tutorial/node51.html.
"Affine Transformation," downloaded from http://www.dai.ed.ac.uk/HIPR2/affine.htm on Oct. 25, 2001.

(Continued)

*Primary Examiner*—Mathew C. Bella
*Assistant Examiner*—Wes Tucker
(74) *Attorney, Agent, or Firm*—Patent Law Group LLP; David C. Hsia

(57) ABSTRACT

A video stabilization system processes a video segment to remove unwanted motion, resulting in a stabilized video segment. The video stabilization system tracks one or more features through multiple frames, identifies ideal positions for the features, and then generates information (e.g., rotation, scaling, shearing, and/or translation) to transform all pixels in each frame to ideal positions based on the ideal positions of the features.

49 Claims, 9 Drawing Sheets

OTHER PUBLICATIONS

"Affine Transformation Matrices," downloaded from http://www.gnome.org/~mathieu/libart-affine-transformation-matrices.htm on Oct. 25, 2001.

"The Method of Least Squares" downloaded from http://www.efunda.com/math/leastsquares/leastsquares.cfm on Oct. 25, 2001.

* cited by examiner

VIDEO STABILIZER

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Field of the Invention

The invention is generally related to digital image processing, and, in particular, is related to video stabilization.

2. Description of Related Art.

Video cameras are becoming more popular today as they become more widely available at lower prices. A video camera records sequential images within "frames." A frame is a representation of an image at an instant of time. Each frame in a video segment (i.e., a sequence of frames) represents the image at a different instant in time. When several frames are recorded, at sequential instances in time, and are shown to the human eye in quick succession, the human eye is able to discern motion in the video segment.

Video (i.e., moving pictures) normally consist of a lot of motion, including object motion, such as a bird flying, and camera motion, such as camera panning, zooming, and tilting. The human eye may feel uncomfortable if the motion in the video is too fast, especially if the motion is changing very quickly in its direction or speed.

Other than natural motion of an object (e.g., one that is moving away from a stable or non-moving video camera), the video camera may record unwanted motion. The term "unwanted" usually refers to camera motion frequently resulting from hand jittering or from the camera person walking or otherwise moving. Other unwanted motion may result if, for example, wind shakes a mounted camera or a vehicle carrying a camera traverses rough terrain. Unwanted motion is very common in home videos.

Unwanted motion is also said to include "high frequency" components. The term "high frequency" refers to the motion changing very quickly in direction (e.g., left to right) or in speed (e.g., getting very fast or slowing down) in a unit of time (e.g., one second).

Video stabilization refers to a process for compensating for "unwanted" motion in a video segment. Video stabilization has been discussed in the literature for a number of years. The problem of "shaking shot" is common in home video. When a hand held camera is unsteady, video frames may be blurred or displaced, making viewing of the video difficult. Some high-end hand held video cameras support hardware video stabilization devices, notably "liquid lens" and electronic solutions. Some video cameras with such electronic solutions include the Sony® DCR-TRV900 video camera available from Sony Electronics, Inc. and the-Canon® ZR20 video camera available from Canon, U.S.A. Inc.

Such devices incorporating electronic solutions are expensive and are typically unavailable to the casual photographer. Moreover, these electronic solutions handle small amounts of movement. The electronic solutions are unable to distinguish between scanning and a lot of shaking, so they are unable to eliminate shaking. Overall, the electronic solutions try to slow down all motion in the video, without distinguishing between wanted and unwanted motion.

Additionally, video stabilization has been a topic in academic research. In some cases, the motion between each pair of consecutive frames or between each frame and a chosen origin frame is estimated. Based on the motion estimation, some inter-frame transformation parameters are computed for transforming (sometimes referred to as warping) each frame with respect to the origin frame. This technique, however, does not work when the camera is moving normally (e.g., panning, zooming, or tilting). Instead, the technique works only with a static camera.

Another conventional solution for unwanted motion is to map the estimated motion to some camera motion model (e.g., panning, zooming, tilting, etc.). Based on the camera model, each frame is transformed (i.e., its pixels are adjusted). There are several difficulties in these techniques. For example, motion estimation in video is time consuming and inaccurate when there are many outliers (i.e., data points that do not fall in the range of other data points). Another difficulty is that it is not uncommon to have several camera motions simultaneously, and, therefore, application of a single camera motion model leads to inaccurate results.

SUMMARY

A video segment is processed to remove unwanted motion, resulting in a stabilized video segment.

According to one embodiment of the invention, a method for stabilizing motion in a sequence of frames is provided. One or more features in a first frame in the sequence of frames are identified. Tracked positions are calculated for one or more features in each other frame in the sequence of frames based on the features in the first frame. Ideal positions are calculated for the features in each other frame in the sequence of frames based on the tracked positions. Transformation information is identified based on the tracked positions and the ideal positions. Each other frame in the sequence of frames is transformed by adjusting pixels based on the transformation information.

According to another embodiment of the invention, a method for stabilizing a sequence of frames is provided. A first position of a point of interest in a first frame is calculated. Estimated positions of points of interest are identified in a second frame and a third frame that correspond to the point of interest in the first frame. Tracked positions of points of interest are identified in the second frame and the third frame based on the estimated positions of the point of interest. The tracked positions comprise a second position for the point of interest in the second frame and a third position for the point of interest in the third frame. The first position, the second position, and the third position are plotted on an X,Y coordinate graph. The first position is connected to the third position on the X,Y coordinate graph. The ideal positions of the point of interest in the first frame, second frame, and third frame lie on the connection.

According to a further embodiment of the invention, a system comprises a computer including a processor and a memory, a sequence of frames stored in the memory, and a program stored in the memory of the computer. The program is executed by the processor of the computer to identify one or more features in a first frame in the sequence of frames and to calculate tracked positions for one or more features in each other frame in the sequence of frames based on the features in the first frame. Execution of the program calculates ideal positions for the features in each other frame in the sequence of frames based on the tracked positions and identifies transformation information based on the tracked positions and the calculated positions. Furthermore, execution of the program transforms each other frame in the sequence of frames by adjusting pixels in each other frame based on the transformation information.

According to yet another embodiment of the invention, a system comprises a camera, a sequence of frames captured by the camera, a computer with a processor and a memory. The sequence of frames is stored in the memory of the computer. The system includes means for performing local tracking to obtain tracked positions for a feature in multiple frames of the sequence of frames and means for calculating ideal positions for the feature in each of the multiple frames. The system also includes means for identifying transformation information based on the tracked positions and the ideal positions for each feature in the one or more features. Additionally, the system includes means for transforming each other frame by adjusting pixels in each other frame based on the transformation information.

According to a further embodiment of the invention, a computer readable storage medium encoded with software instructions. Execution of the instructions performs the following: one or more features in a first frame in the sequence of frames are identified; tracked positions are calculated for one or more features in each other frame in the sequence of frames based on the features in the first frame; ideal positions are calculated for the features in each other frame in the sequence of frames based on the tracked positions; transformation information is identified based on the tracked positions and the calculated positions; and, each other frame in the sequence of frames is transformed by adjusting pixels in each other frame based on the transformation information.

The invention is better understood upon consideration of the detailed description below, and the accompanying drawings.

BRIEF DESCRIPTION OF THE DRAWINGS

Use of the same reference symbols in different figures indicates similar or identical items.

DETAILED DESCRIPTION

In accordance with an embodiment of the invention, a computer programmed with software (referred to herein as "video stabilization system") processes a video segment to remove unwanted motion, resulting in a stabilized video segment. The video stabilization system tracks one or more features through multiple frames, identifies ideal positions for the features, and then generates transformation information (e.g., rotation, scaling, shearing, and/or translation) to transform all pixels in each frame to ideal positions based on the ideal positions of the features.

In particular, the video stabilization system of the invention tracks some features all the way through some video segment, rather than estimating camera motion between two frames. In one embodiment, a "feature" may be, for example, a point, line, region, edge, etc. For example, a feature may be a point of interest in an image that represents a large brightness change in two dimensions.

A video segment includes a sequence of frames. Each frame represents an image (simplistically, this can be viewed as a picture taken with a camera). If a sequence of frames is taken of an image that is not moving with a video camera that is not moving, each pair of consecutive frames will be almost exact (note there may be some change due to hand jitter and other factors).

On the other hand, if the sequence of frames are taken of a moving object, or the video camera is moving, or both, consecutive frames capture different images. If there is smooth motion, then it is possible to select a feature in a first frame, find the corresponding pixel or pixels associated with that feature in subsequent frames, map the points on a graph (e.g., an X-Y graph), and obtain a smooth path when the positions of the features are connected. When there is unwanted motion, however, a feature across frames does not follow a smooth path. This results in "jitters" when viewed by the human eye. The video stabilization system of the invention identifies the trajectory of a set of features and adjusts them to "ideal positions" that results in a smooth video segment.

The video stabilization system reduces and/or removes the unwanted motion (also referred to as a "high frequency portion") without affecting normal motion (also referred to as a "low frequency portion"). Therefore, a camera need not be ideally static or have only one type of motion.

The software solution has many advantages over a hardware solution (e.g., liquid lens). For example, the video stabilization system can classify the "normal" camera motion and jittering or unwanted motion. The video stabilization system can correct larger displacement (e.g., caused by a fast moving camera) than hardware. The video stabilization system can stabilize video from any video camera, rather than from high-end products, as is the case with hardware solutions. Furthermore, software production also costs less than hardware manufacturing.

Figure 1:
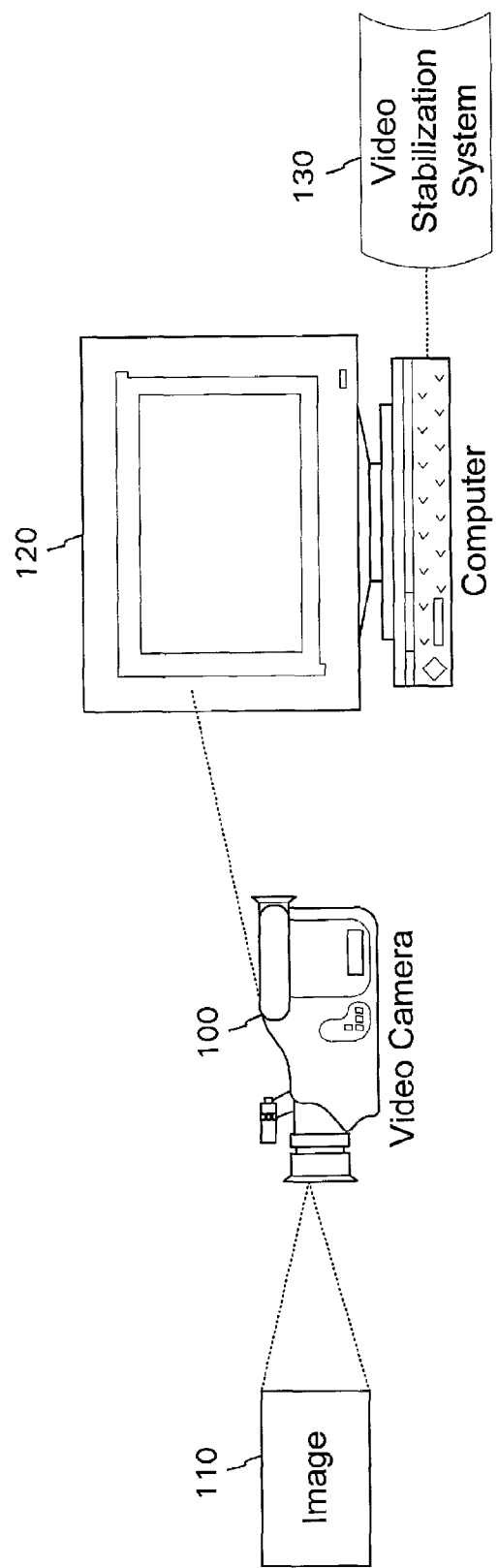
FIG. 1 is a block diagram that illustrates components that may be used in one embodiment of the invention.

FIG. 1 is a block diagram that illustrates components that may be used in one embodiment of the invention. In one embodiment, a video camera 100 records an image 110. The video camera 100 and/or the image may be in motion. The video camera 100 includes data storage that stores the video segment. The video segment is transferred to a computer 120, which includes video stabilization system 130 stored, for example, on a hard drive of the computer 120 or a CD-ROM (compact disc-read only memory) inserted into the CD-ROM drive of the computer 120. In other embodiments, the video stabilization system 130 may be implemented as a hardware video stabilizer or as a combination of hardware and software.

In one embodiment, the video camera 100 is a digital video camera. Digital video cameras offer many advantages. For example, digital images are easier to manipulate and easier to distribute over electronic media (e.g., the Internet or e-mail). In another embodiment, the video camera 100 is an analog video camera using film to record images. The film can be converted to digital images for processing with the video stabilization system 130. In yet another embodiment, a still picture camera, rather than video camera 100, is used to take a series of pictures that are either digitally recorded or converted to digital images. The series of pictures are transformed into a video segment that may be processed with the video stabilization system 130.

The video stabilization system works with both gray scale or color images. For example, each image can be a two-dimensional array of RGB (red-green-blue) pixels or YUV pixel values representing color pixels. YUV is defined by the Commission International de L'Eclairage (CIE), which is an international committee for color standards. YUV is often used in Phase Alternation Line (PAL) television (an analog television display standard), where the luminance and the chrominance are treated as separate components. In YUV systems, a luminance signal (represented with "Y") typically occupies the maximum bandwidth, while chrominance signals (represented by "U" and "V") typically occupy half the bandwidth each (i.e., because the eye is less sensitive to color detail).

In one embodiment, the images are represented in Microsoft Windows™ 24-bit BITMAP format. In this format, each pixel has three adjacent bytes for Blue, Green, and Red channels respectively. In one embodiment, each of the source images is W (i.e., width) by H (i.e., height) pixels. For example, the dimensions may be 720×480 pixels or 352×288 pixels.

Figure 2:
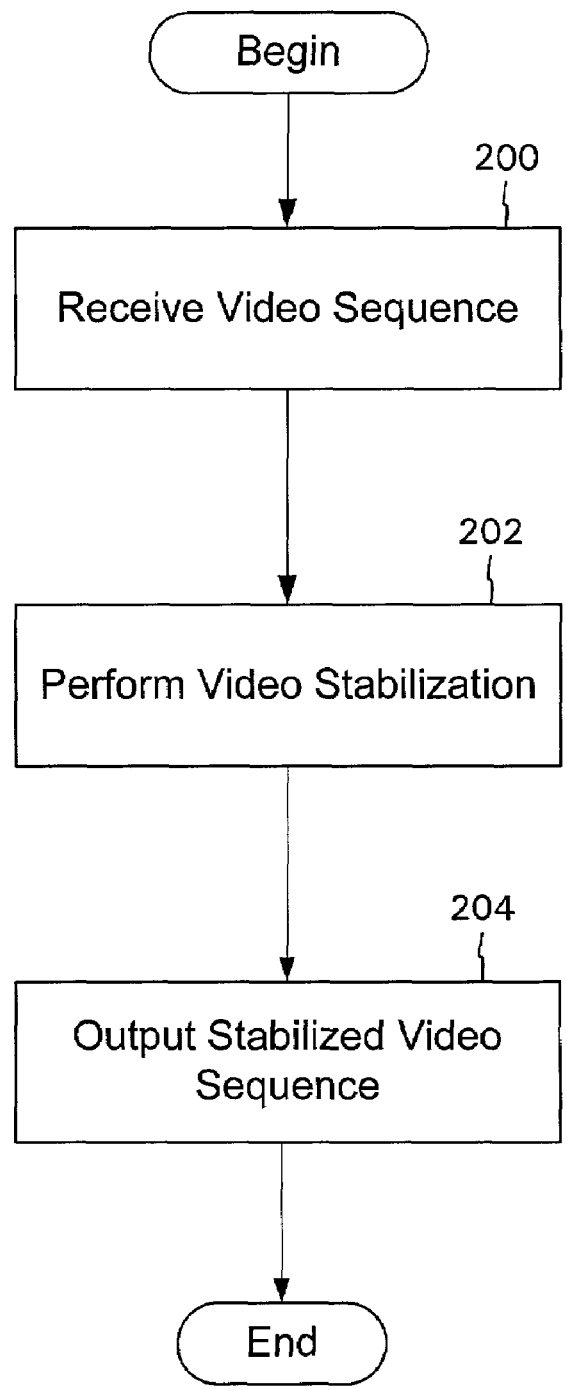
FIG. 2 is a flow diagram that illustrates processing of a video segment in one embodiment of the invention.

FIG. 2 is a flow diagram that illustrates processing of a video segment in one embodiment of the invention. In particular, block 200 represents the video stabilization system 130 receiving a video segment. Block 202 represents the video stabilization system 130 performing video stabilization to remove unwanted motion from the video segment. For example, the video stabilization system 130 processes the data to reduce the jitter caused by unintended camera motion. Block 204 represents the video stabilization system 130 outputting a stabilized video segment. The stabilized video segment may be output to local data storage, remote data storage, to a user monitor, to television transmitters, or to another device. The digital images may be converted to analog images. Also, the stabilized video segment may be output to other software for additional processing.

In an alternative embodiment, as a video camera 100 captures images, the video camera 100 transfers data directly to computer 120, which has sufficient memory to hold the data. The computer 120 processes the data in real time to reduce jitter, and, for example, transfers the data to storage, to a user monitor, or to television transmitters.

The computer 120 may be a personal computer, workstation, laptop computer, personal digital assistant, mainframe computer, or other processing device. Also, the computer 120 may be a general purpose or a special purpose computer. For example, computer 120 may be a computer having a Pentium® chip, available from computer vendors such as International Business Machines Corporation, Inc., of Armonk, N.Y. or Apple Computer, Inc. of Cupertino, Calif. The computer 120 may include an operating system, such as Microsoft® Windows® 2000 from Microsoft Corp. of Redmond, Wash.

Given ongoing advances in the data processing industry, it is conceivable that the storage and processing features illustrated in FIG. 1 may be incorporated on integrated circuits, microprocessors, and other electronics small enough to fit within a handheld video camera. Therefore, the video stabilization system 130 may be incorporated into the video camera 100 as software, hardware, or a combination of hardware and software. Nevertheless, merely reducing the size or altering the location of elements of this invention does not depart from the spirit and scope of the invention.

Figure 3A:
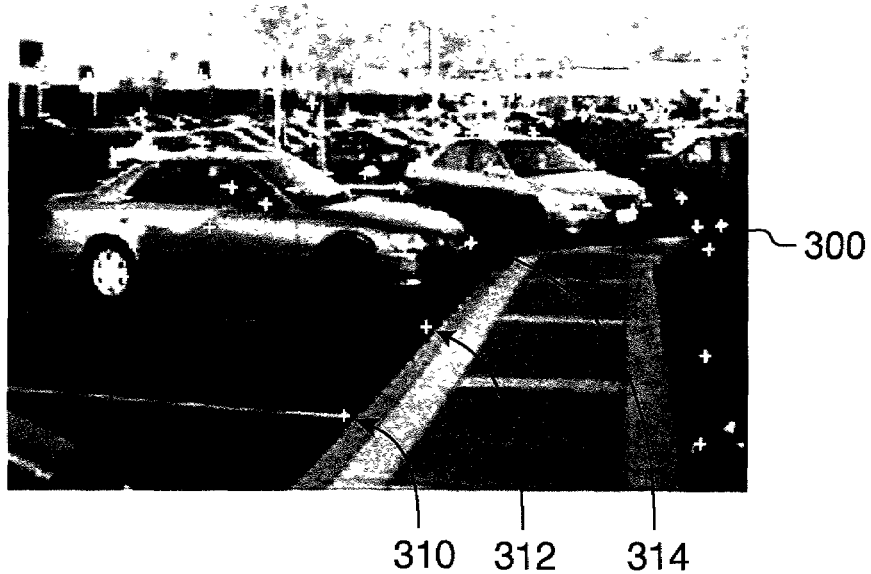
FIGS. 3A, 3B, and 3C illustrate frames in a video segment in one embodiment of the invention.
Figure 3B:
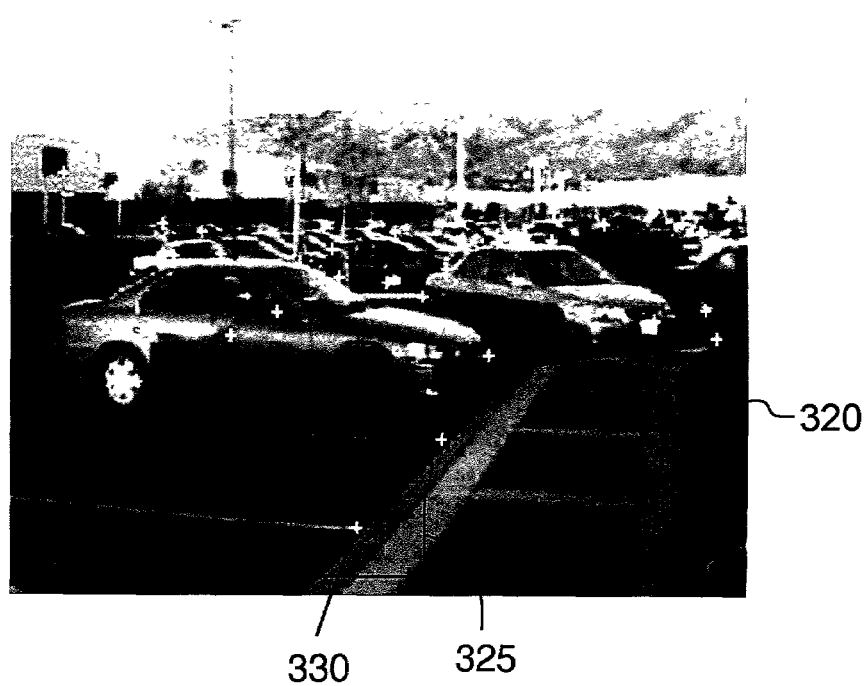
Figure 3C:
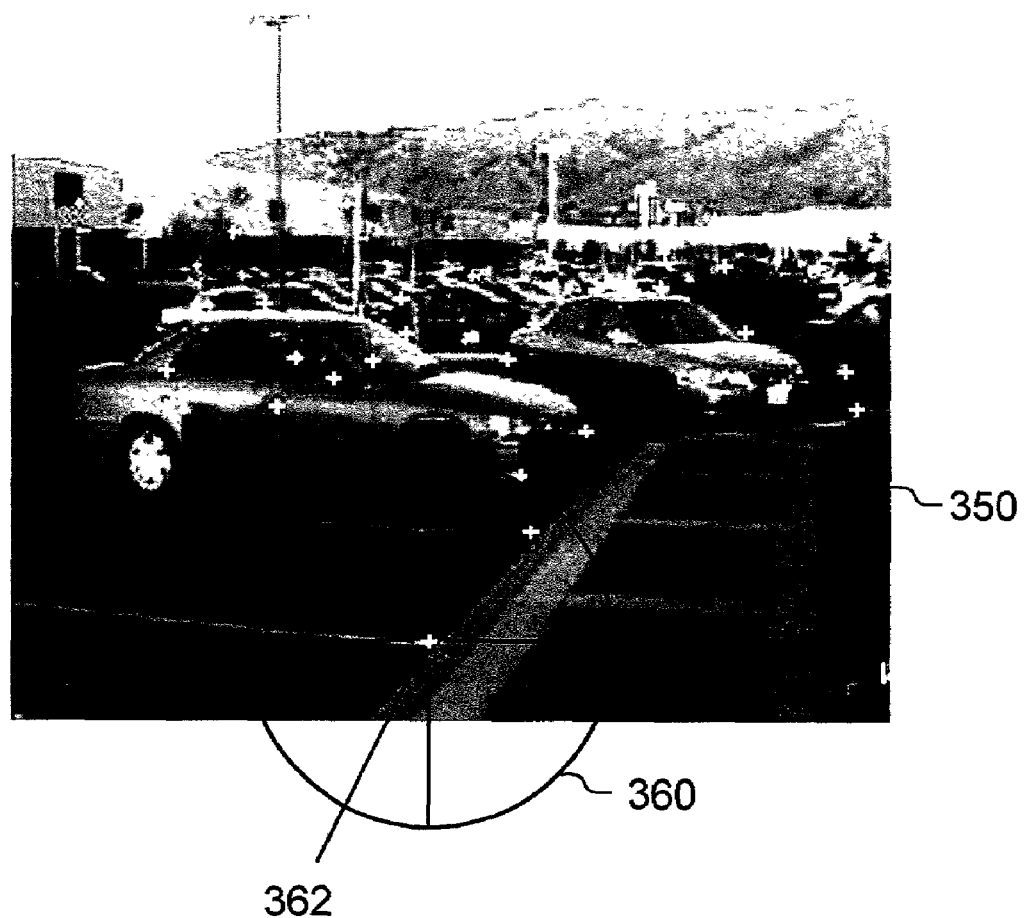

FIGS. 3A, 3B, and 3C illustrate frames in a video segment in one embodiment of the invention. In FIG. 3A, a scene is the subject of a video camera recording resulting in frame 300. In the scene, one or more objects (e.g., cars) may have been in motion. Additionally, the video camera may have been in motion (e.g., panning, zooming or tilting). This is referred to as normal motion. In addition, there may be unintended motion of the camera caused by, for example, the camera person walking while recording.

In FIG. 3A, multiple points of interest (POIs) have been detected in frame 300. Although points of interest are illustrated in FIGS. 3A, 3B, and 3C, other features may be used in accordance with the technique of the invention. In this illustration, crossbars (i.e., +) are used to indicate points of interest, such as 310, 312, and 314. In one embodiment, at least 3 points of interest are tracked through a video segment. FIGS. 3B and 3C illustrate subsequent frames to FIG. 3A in a video segment.

Figure 4A:
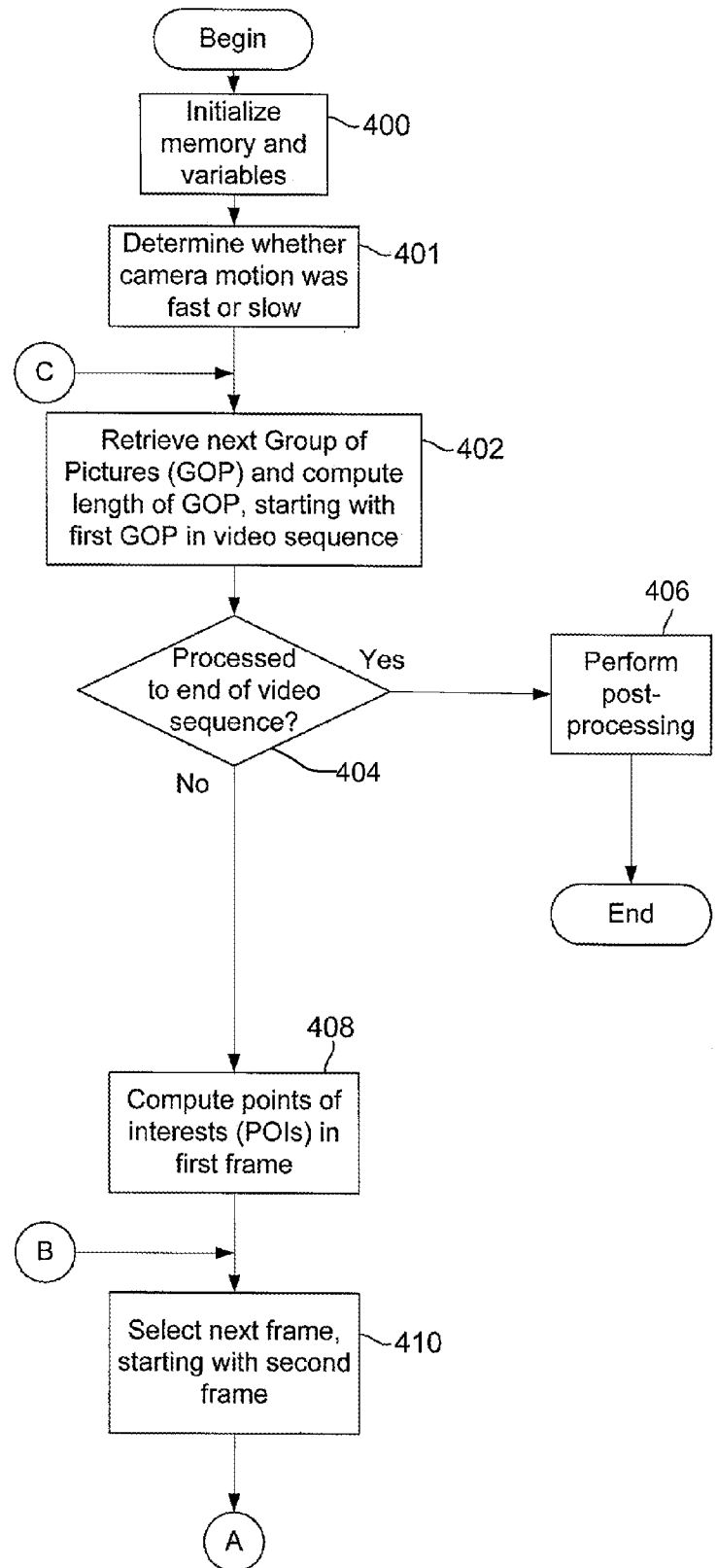
FIGS. 4A and 4B are flow diagrams that illustrate video stabilization processing in one embodiment of the invention.
Figure 4B:
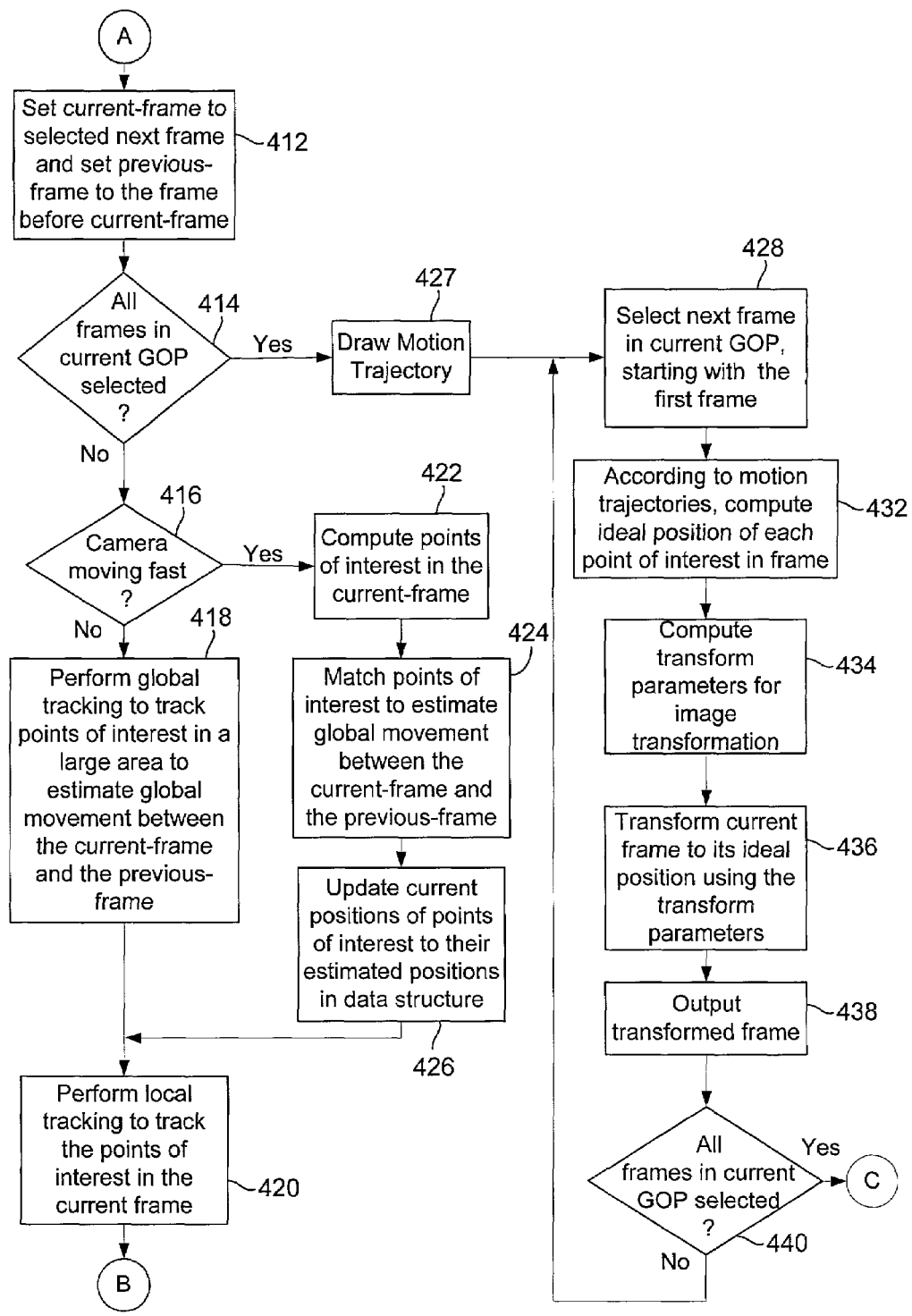

FIGS. 4A and 4B are flow diagrams that illustrate video stabilization processing in one embodiment of the invention. For ease of illustration, the flow diagrams refer to a point of interest, which is one type of feature. It is to be understood that the technique of the invention is applicable to any type of feature or distinguishing characteristic between frames.

Block 400 represents the video stabilization system 130 initializing memory and variables. Initialization is performed to initialize variables, allocate memory, and open an input video file, such as an Audio Video Interleaved (AVI) file. In one embodiment, a video file is one in which motion picture and audio are interleaved.

Block 401 represents the video stabilization system 130 determining whether the video camera motion was fast or slow. In one embodiment, a user submits input indicating whether the camera moved fast or slow. In another embodiment, the video stabilization system 130 compares one or more points in a series of frames and determines whether the motion was fast or slow based on the amount of distance each point moved from one frame to another.

For example, if the video stabilization system 130 finds that point (3,3) in frame 1, is in location (30,30) in frame 2, the video stabilization system 130 detects that the camera motion was fast. While, for example, if the same point (3,3) in frame 1 is in location (4,4) in frame 2, the video stabilization system 130 detects that the camera motion was slow.

Figure 5:
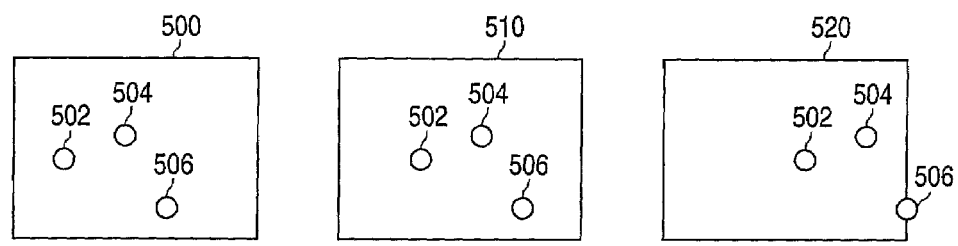
FIG. 5 illustrates motion of points of interest of an image when motion is slow versus when motion is fast in one embodiment of the invention.

FIG. 5 illustrates motion of points of interest of an image when motion is slow versus when motion is fast in one embodiment of the invention. Image 500 is a first image having three points of interest 502, 504, and 506. Image 510 represents a second image captured when motion is slow, and points of interest 502, 504, and 506 have moved horizontally relative to their positions in image 500. Image 520 represents a third image captured when motion is fast, and points of interest 502, 504, and 506 have moved horizontally relative to their positions in image 500. In image 520, point of interest 506 has partially moved off of the image. Points of interest 502, 504, and 506 have moved more in image 520 than in image 510.

The video stabilization system 130 processes groups of pictures in the video segment. Block 402 represents the video stabilization system 130 retrieving a sequence of frames of a video segment from storage or memory. In particular, the video stabilization system 130 selects a video segment made up of a sequence of frames and designates this as a group of pictures (GOP). In one embodiment, a group of pictures may include frames captured during 2–3 seconds of recording, and approximately 25–30 frames may be captured each second. So, a group of pictures may include 50–90 frames.

In another embodiment, a set number of frames (e.g., 60 frames) are selected as a group of pictures. At this point, the length of the group of pictures is calculated.

In either embodiment, the video stabilization system 130 may start with a long video segment (e.g., 3 seconds or 90 frames). If the video stabilization system 130 determines that many (e.g., more than half) of the points of interest in the first frame are missing from the last frame in the sequence, then the video stabilization system 130 may truncate the video segment and process a smaller sequence of frames. Then, the next video segment processed would begin at the truncated position. For example, if the video stabilization system 130 initially took a video segment having 90 frames and truncated the video segment to work with 40 frames, the next video segment would start at the 41$^{st}$ frame.

Block 404 represents the video stabilization system 130 determining whether the video segment has been completely processed (i.e., to its end). If not, processing continues to block 408. Otherwise, processing continues to block 406 and post-processing is performed. Post-processing includes freeing memory and closing the output .avi file.

Block 408 represents the video stabilization system 130 computing points of interest (POIs) for the first frame. For example, FIG. 3A illustrates a first frame with points of interest. These points of interest may be selected using, for example, the Harris technique for corner and edge detection or the Kitchen-Rosenfeld technique for corner detection. For more information on the Harris technique, see "A Combined Corner and Edge Detector," by C. Harris and M. Stephens, Fourth Alvey Vision Conference, pp. 147–151, 1988, which was available for download from the website of the Department of Electrical Engineering of the University of Leuven, which is incorporated herein by reference in its entirety and is listed in Appendix A. For more information on the Kitchen-Rosenfeld technique, see "Gray-Level Corner Detection," by L. Kitchen and A. Rosenfeld, Pattern Recognition Letters, 95–102, December, 1982, which is incorporated herein by reference in its entirety.

Figure 6:
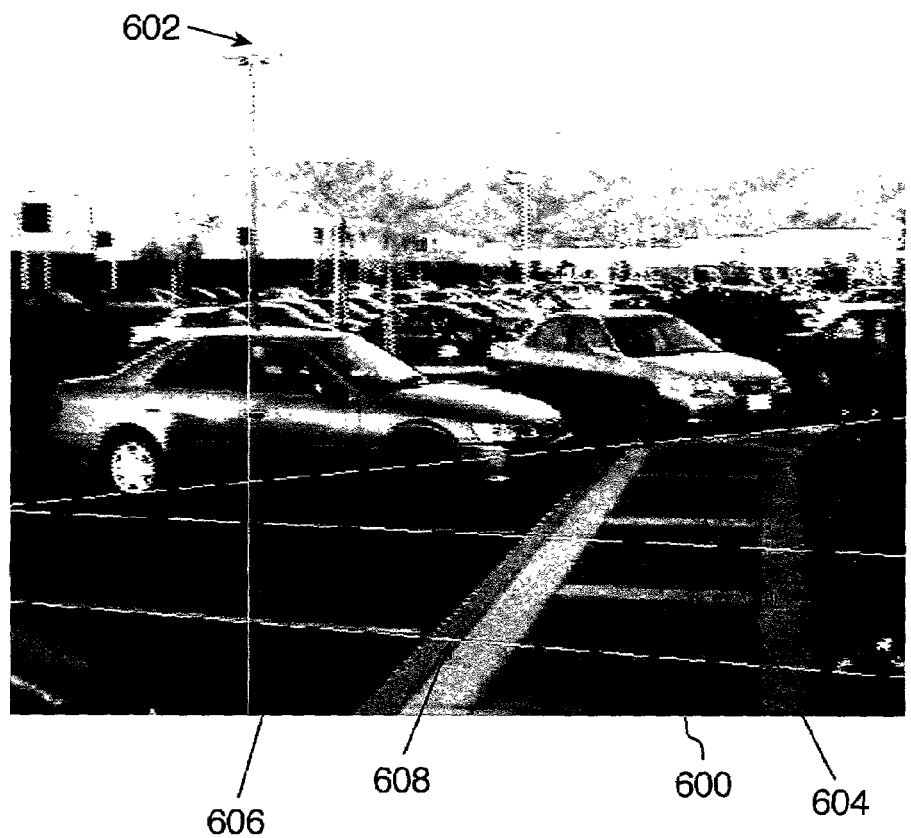
FIG. 6 illiterates lines in a frame in one embodiment of the invention.

Alternatively the Hough transform technique for line detection (rather than point of interest detection) may be used. For example, if the Hough transform technique were used, lines would be detected and compared in frames, rather than points of interest. FIG. 6 illiterates lines in a frame 600 in one embodiment of the invention. For example, vertical line 602 is found along a telephone pole, horizontal line 604 is found along a sidewalk, and horizontal lines 606 and 608 are found along parking space markings. Although the lines depicted in FIG. 6 extend across much of frame 600, the lines could be shorter segments in alternative embodiments.

For more information on the Hough transform technique, see "Fundamentals of Digital Image Processing," by Anil K. Jain, Prentice-Hall, Inc., page 362, 1989 or "Digital Image Processing," by Rafael C. Gonzalez and Richard E. Woods, page 432–438, each of which is incorporated herein by reference in its entirety. In one embodiment, the positions of the points of interest of the first frame may be stored in a linked list. However, alternative data structures such as tables may be used. For ease of illustration, a table will be used to provide an example. The following Table A is a sample table of positions of points of interest in a first frame (e.g., frame 300 of FIG. 3A):

TABLE A

| Frame 1 | X-coordinate | Y-coordinate |
|---------|--------------|--------------|
| Point 1 | 7 | 3 |
| Point 2 | 8 | 7 |
| Point 3 | 9 | 8 |

For each pair of consecutive frames, the video stabilization system 130 identifies positions for corresponding points of interest (blocks 410–426). In particular, the video stabilization system 130 identifies estimated positions for points of interest in blocks 418 and 424. Then, in block 420, the video stabilization system 130 identifies tracked positions for the points of interest. The tracked positions are more accurate than the estimated positions.

In an alternative embodiment, a selected frame, such as the first frame or the middle frame in a group of pictures, may be compared to every other frame. This alternative works well when there is little change between the compared frames. Block 410 represents the video stabilization system 130 selecting the next frame in the group of pictures, starting with the second frame. Block 412 represents the video stabilization system 130 setting a current-frame variable to the selected next frame and setting a previous-frame variable to the frame before the current-frame. Initially, the video stabilization system 130 works with a first frame and a second frame (which represent the previous and current frames, respectively, in one iteration of the process).

Block 414 represents the video stabilization system 130 determining whether all the frames in the group of pictures have been selected and processed. If so, processing continues to block 427. Otherwise, processing continues to block 416. Block 416 represents the video stabilization system 130 determining whether the camera was moving fast when the video segment was recorded (this information is determined in block 401).

If the intended motion of the camera (e.g., pan, zoom, or tilt) is slow, then global tracking is performed in the second frame with respect to the points of interest selected for the first frame. If the motion is fast, a new set of points of interest are detected in the second frame and matching (rather than tracking) is performed in the first frame for these points of interest. In one embodiment, global tracking refers to selecting a point of interest in a first frame, such as (3, 3), and searching a large area in the second frame around this point, such as searching a 16×16 area around (3, 3) in the second frame, for a point of interest corresponding to the point of interest in a first frame. In one embodiment, matching refers to selecting points of interest in a first frame, selecting points of interest in a second frame, and attempting to match the points of interest in the first frame to those in the second frame.

In one embodiment, frames are examined in consecutive pairs. One pair includes a first frame and a second frame (which are also referred to as a previous frame and a current frame, respectively).

In block 418, the video stabilization system 130 performs global tracking. There are many techniques that may be used to perform tracking (global or local). One technique is described in "Making Good Features Track Better, by Tiziano Tommasini, Andrea Fusiello, Emanuele Trucco, and Vito Roberto, pages 1–6, which is incorporated herein by reference in its entirety. For global tracking, the points of interest from the first frame are tracked in a large area in the second frame to estimate the global movement between the first frame and the second frame. For global tracking, initially, a first point of interest in a first frame is selected. For this point of interest, the video stabilization system 130 attempts to find a point of interest within an area of a second (e.g., consecutive) frame that estimates the position of the point of interest in the first frame. This estimated position of the point of interest in the second frame may not be the point of interest that actually corresponds to the point of interest in the first frame due to possible errors with the tracking technique. The estimated position is only an estimate of where the point of interest from the first frame is in the second frame, considering there may have been camera and/or object motion. As will be discussed with respect to local tracking in block 420, additional processing is done to confirm that the estimated position of the point of interest actually corresponds to the point of interest in the first frame.

For example, the video stabilization system 130 may search a 16×16 pixel area around the location of the first point of interest in the second frame. For example, if the first point of interest is (8, 8) in the first frame, then the area formed by corner points (0, 0), (0, 16), (16, 0), and (16, 16) may be searched for a corresponding point of interest in the second frame. The result is an estimated position of the point of interest in the second frame.

Figure 7A:
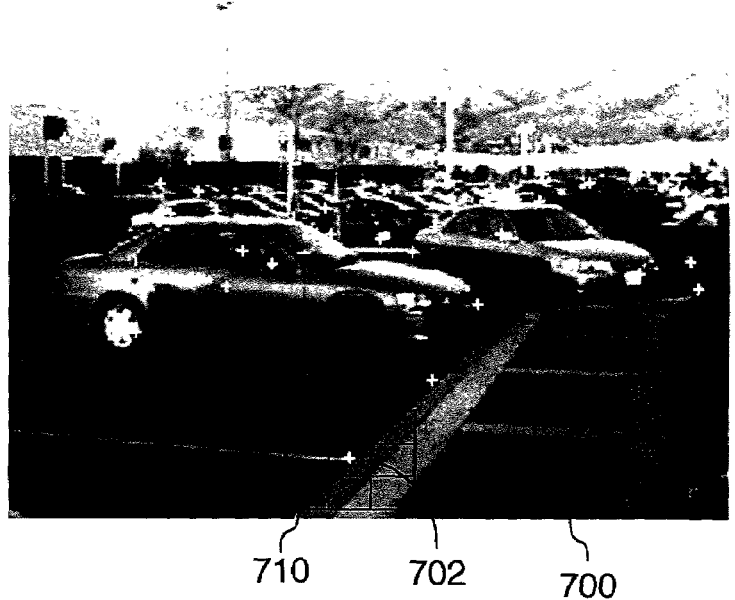
FIGS. 7A, 7B, and 7C illustrate tracking in one embodiment of the invention.
Figure 7B:
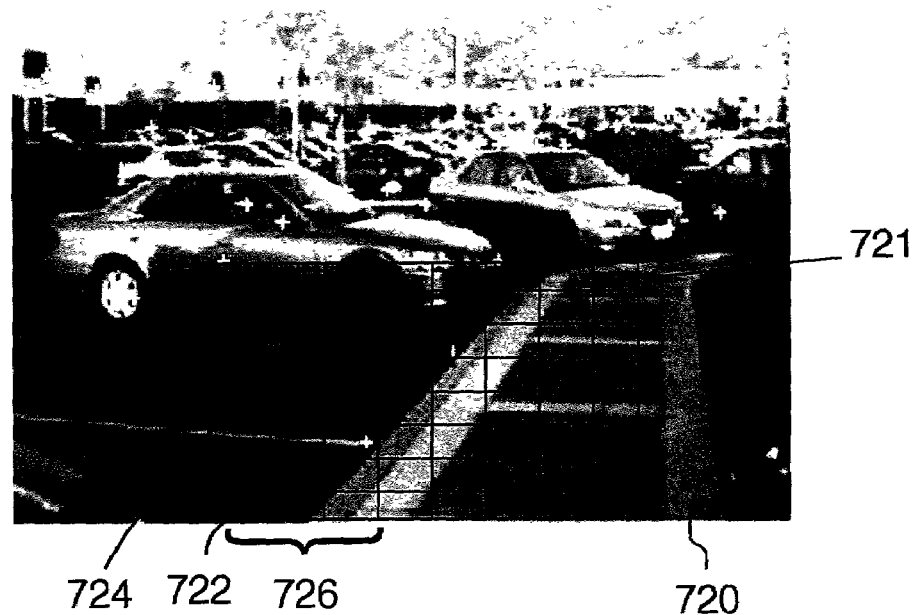
Figure 7C:
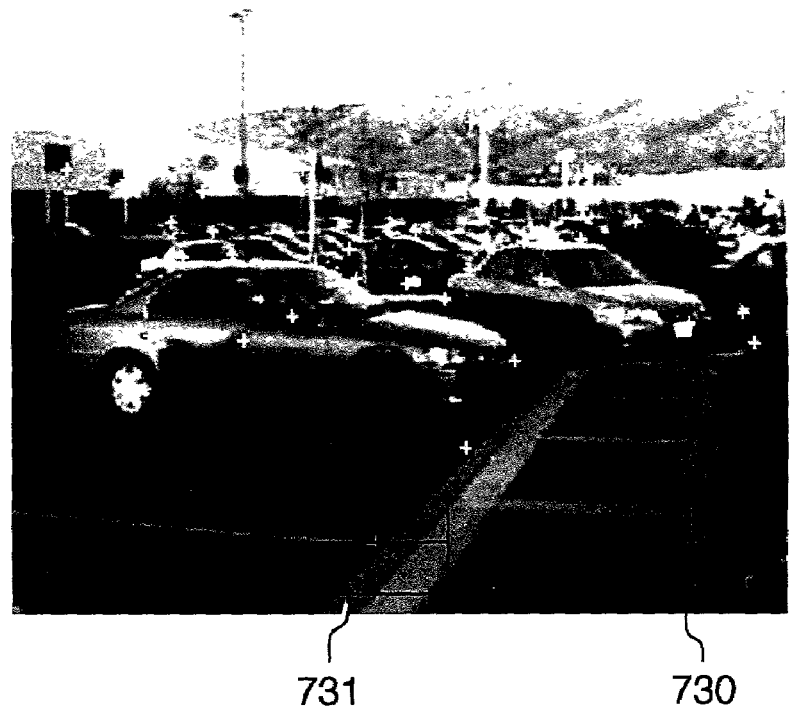

FIGS. 7A, 7B, and 7C illustrate tracking in one embodiment of the invention. Once, point of interest is identified in a first frame, such as frame 700 in FIG. 7A, then a 3×3 "window" is used to obtain the pixel value of each pixel in the 3×3 area 710 in which the point of interest 702 is the center pixel. Each pixel has a value associated with it. For example, when an image represented with a two-dimensional array of RGB (red-green-blue) pixels, each pixel has a value associated with it ranging from 0–255. A larger pixel value may be indicative of, for example, a brighter, more colorful pixel. In alternative embodiments, the area 710 selected may be smaller or larger than 3×3.

Next, for a second frame 720 in FIG. 7B, the video stabilization system 130 selects a large area, such as area 721. Within 8×8 area 721, for each pixel, the video stabilization system 130 selects a pixel, designates the selected pixel as a center pixel of a 3×3 area, and identifies the pixel value of each pixel in the 3×3 area. For example, for pixel 722, the video stabilization system identifies the pixel values of each pixel in the 3×3 area designated by brackets 724 and 726. Once, this is done for each pixel in area 721, the video stabilization system attempts to find the pixel in the second frame 720 which is most similar to the point of interest 702 in the first frame 700.

In one embodiment, the video stabilization system 130 will compare the differences between the 3×3 area 710 in the first frame with each 3×3 area surrounding each pixel in the second frame to determine which pixel in the second frame has "neighboring" pixels (i.e., pixels that are one position away from the center pixel in any direction) that are most similar to the point of interest in the first frame.

After global tracking, the video stabilization system 130 has identified estimated positions for the points of interest in the second frame that estimate points of interest in the first frame. At this time, these are estimated positions for points of interest because the positions could be inaccurate. That is, the tracking technique of looking at neighboring pixel values may result in finding a pixel in the second frame that does not correspond to the point of interest in the first frame. Local tracking, performed in block 420, attempts to confirm whether global tracking found the correct position of the point of interest in the second frame. Local tracking is described below with reference to FIG. 7C.

In one embodiment, the estimated positions of points of interest may be stored in a linked list. However, alternative data structures such as tables may be used. For ease of illustration, a table will be used to provide an example. The following Table B is a sample table of estimated positions of points of interest in a second frame that correspond to points of interest in the first frame (illustrated in Table A) after global tracking has been performed (block 418).

TABLE B

| Estimated Positions from Global Tracking | | |
|---|---|---|
| Frame 2 | X-coordinate | Y-coordinate |
| Point 1 | 8 | 3 |
| Point 2 | 9 | 8 |
| Point 3 | 10 | 9 |

In one embodiment, global tracking may be performed using epipolar geometric constraints to narrow down the tracking area and to remove outliers (i.e., points of interest that are far away from other points of interest). For more information on epipolar geometry, see "A Robust Technique for Matching Two Uncalibrated Images Through the Recovery of the Unknown Epipolar Geometry," by Zhengyou Zhang, pages 1–38, May 1994, which is incorporated herein by reference in its entirety.

On the other hand, if camera motion is fast, a new set of points of interest are selected in the second frame (block 422). Then, for each of these points, the video stabilization system 130 attempts to match points of interest in the second frame to points of interest in the first frame to estimate global movement between the first and second frames (block 424).

In one embodiment, for two frames, points of interest are calculated in each frame. Then, for each point of interest in each frame, the video stabilization system 130 computes a neighbor (i.e., another point of interest in that frame) distribution in terms of distance and direction. For example, in FIG. 3C, for frame 350, the video stabilization system 130 identifies an area 360 around point of interest 362. The area 360 may be, for example, a circular area having a specified radius. Then, the video stabilization system 130 generates a distance histogram (indicating the distance of each neighbor in the area 360 from the point of interest) and a direction histogram (indicating the direction of each neighbor, such as above and to the left, relative to the point of interest). The area 360 may be partitioned into sections for ease in generating the histograms. The histograms are generated by the video stabilization system 130 for each point of interest in the first and second frames. The video stabilization system 130 determines that a point of interest in a first frame corresponds to a point of interest in a second frame if they have the most similar neighbor distributions (e.g., two points of interest have neighbors at approximately the same distance and direction away from them). In this example, point of interest 362 at estimated position (7, 4) corresponds to point of interest 310 in the first frame illustrated in FIG. 3A.

In an alternative embodiment, the matching technique described in "A Fast Matching Method for Color Uncalibrated Images Using Differential Invariants," British Machine Vision Conference, by V. Gouet, P. Montesinos, D. Pel, pages 367–376 may be used, and this article is incorporated herein by reference in its entirety.

In other embodiments, matching can be implemented using any correlation technique known in the art. For example, a description of image matching by correlation can be found in "Digital Image Processing" by R. Gonzales and R. Woods, Addison-Wesley Publishing Co., Inc., 1992, pages 583–586. Correlation is a technique for matching two images by finding, for an observed region on the first image, the corresponding region on the second image. Correlation may be performed by selecting an observed region defined by a window in the first image. Then, the second image is searched by moving the window around the entire image area and computing the correlation between the observed region and each of the areas in the second image. The similarity between two areas are determined using correlation criteria and a match between the two areas is found when the correlation yields the largest correlation value. When a match between the observed region and the match region is found, the distance from the observed point and its match is called "disparity" having units in pixels.

In another embodiment, the correlation process further includes a brightness normalization operation to account for the fact that first and second images may be captured at different times with different exposure parameters.

Block 426 represents the video stabilization system 130 updating the current positions of points of interest to their estimated positions in a data structure. In one embodiment, this information may be stored in a linked list. However, alternative data structures such as tables may be used. For ease of illustration, a table will be used to provide an example. In this example, The following Table C is a sample table of estimated positions of points of interest in a second frame that match points of interest in the first frame (illustrated in Table A):

TABLE C

Estimated Positions from Matching

| Frame 2 | X-coordinate | Y-coordinate |
|---------|--------------|--------------|
| Point 1 | 7            | 4            |
| Point 2 | 9            | 7            |
| Point 3 | 10           | 8            |

Whether camera motion is slow or fast, it is possible that a first point of interest in a first frame is no longer in the second frame (i.e., it has moved completely off the frame). Therefore, it may be that not every point of interest in one frame has a corresponding point of interest in a second frame. Additionally, there may be new points of interest in the second frame that do not have corresponding points of interest in the first frame.

Next, the video stabilization system performs local tracking (block 420) on estimated positions of points of interest. In one embodiment, local tracking may be performed using epipolar geometric constraints to narrow down the tracking area and to remove outliers (i.e., points of interest that are far away from other points of interest). For more information on epipolar geometry, see "A Robust Technique for Matching Two Uncalibrated Images Through the Recovery of the Unknown Epipolar Geometry," by Zhengyou Zhang, pages 1–38, May 1994, which is incorporated herein by reference in its entirety.

In particular, the estimated positions of points of interest (from either global tracking in block 418 or matching in block 424) are tracked again, but in a smaller area, such as an area 2×2 pixels in size. For example, in frame 730 of FIG. 7C, 2×2 area 731 is tracked. That is, the 3×3 window used for frame 700 is applied to each pixel in the 2×2 area 731. Each pixel in area 731 is treated as the center of a 3×3 area, and the values of the pixels in the 3×3 area are identified. Then, the pixel values in each 3×3 area are compared to the pixel values in the 3×3 area 710 of frame 700. The result may be that the estimated position of a point of interest in a second frame is found to be the correct position that corresponds to the point of interest in the first frame, taking into consideration motion of the camera and/or object. Thus, local tracking adjusts the estimated position of points of interest for improved accuracy, resulting in tracked positions of points of interest.

The result of blocks 410–426 is a table illustrating, for each point of interest, a tracked position for each corresponding point of interest in each subsequent frame.

The following Table D is a sample table illustrating tracked positions of points of interest for a second frame after local tracking has been performed (block 420):

TABLE D

Tracked Positions from Local Tracking

| Frame 2 | X-coordinate | Y-coordinate |
|---------|--------------|--------------|
| Point 1 | 9            | 4            |
| Point 2 | 11           | 8            |
| Point 3 | 10           | 8            |

After determining the motion of the points of interest, the video stabilization system 130 draws a motion trajectory (block 427) for each point of interest across multiple frames. In particular, the video stabilization system 130 selects a point of interest. For the selected point of interest, the video stabilization system 130 plots the tracked positions (identified in block 420) of the point of interest across a sequence of frames on an X,Y coordinate graph. Next, the video stabilization system 130 connects the first position to the last position in the graph using a linear or non-linear connection (e.g., a line or a curve, respectively). The linear or non-linear connection is referred to as a motion trajectory. All positions on the motion trajectory are considered to be ideal positions, while positions of the point of interest that do not fall on the motion trajectory are considered to include unwanted motion.

Figure 8A:
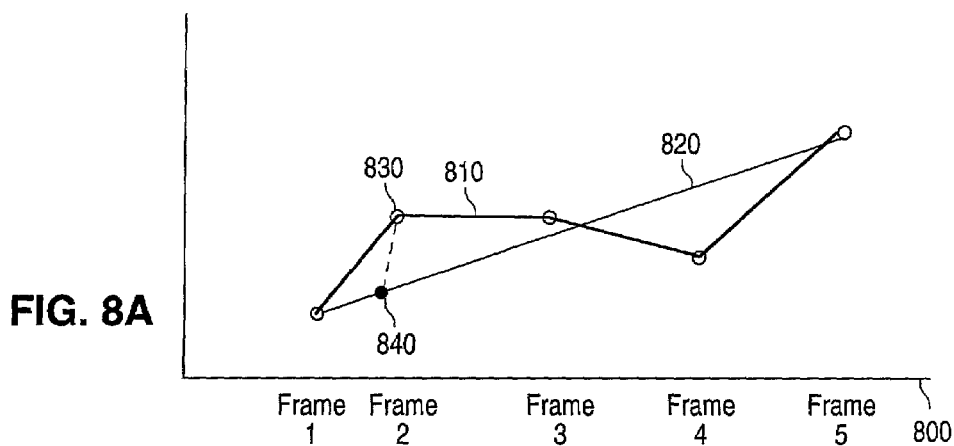
FIGS. 8A and 8B illustrate sample graphs showing motion trajectories in embodiments of the invention.
Figure 8B:
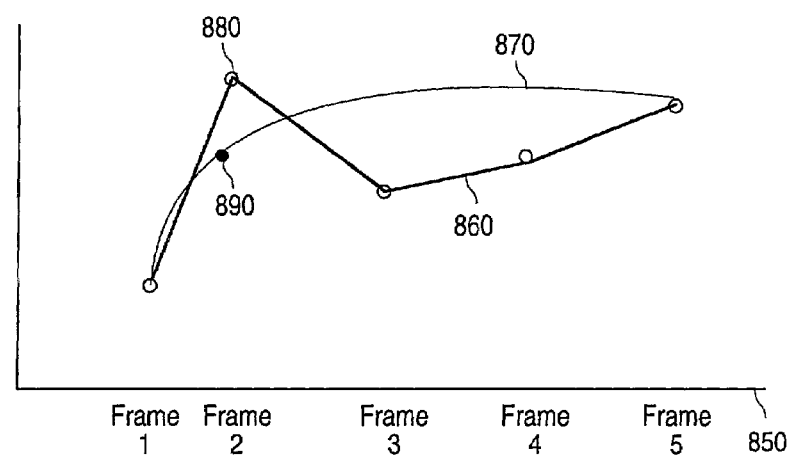

FIGS. 8A and 8B illustrate sample graphs 800 and 850 showing motion trajectories in embodiments of the invention. Each graph 800 and 850 illustrates a motion trajectory for one point of interest across five frames. The motion trajectories are drawn using the tracked positions of one point of interest. If each of the positions were connected together, the result may be a line that is not smooth, which represents a combination of normal motion and unwanted motion. The video stabilization system 130 removes the unwanted motion from the combination, leaving only the normal motion. The normal motion of a point of interest may be linear (e.g., FIG. 8A) or nonlinear (e.g., FIG. 8B).

In one embodiment, as illustrated by FIG. 8A, the video stabilization system 130 uses linear interpolation for each point of interest across five frames in a group of pictures. In particular, after plotting the tracked positions of one point of interest, the video stabilization system 130 draws a line from the first position of the point of interest to the last position of the point of interest. Then, the video stabilization system 130 determines that the ideal positions for a point of interest across the frames fall on the line.

In graph 800, a motion trajectory for one point of interest, referred to as Point 1, is illustrated. For this example, Point 1 has position (7, 3) in a first frame (Table A), tracked position (11, 8) in a second frame (Table D), tracked position (19, 8) in a third frame, tracked position (27, 6) in a fourth frame, and tracked position (35, 13) in a fifth frame. These positions are plotted in graph 800. Then, a line is drawn that connects the position of Point 1 in the first frame of the video segment to the position of Point 1 in the fifth frame of the video segment. In graph 800, the combined motion is represented by line 810, while the normal motion is represented by line 820. For the tracked position (11, 8) 830 of the point of interest in the second frame (labeled "Frame 2"), the ideal position is (11, 5) 840. The difference between the tracked position (11, 8) and the ideal position (11, 5), which is a vertical 3 pixel change, represents the unwanted motion that is removed. In one embodiment, the ideal position of a point of interest has the same X-coordinate and a different Y-coordinate when compared to the tracked position of the same point of interest.

Table E is a sample table illustrating ideal positions of one point of interest across three frames:

TABLE E

| Point 1 | Ideal Positions | |
|---|---|---|
| | X-coordinate | Y-coordinate |
| Frame 1 | 7 | 3 |
| Frame 2 | 11 | 5 |
| Frame 3 | 19 | 7 |
| Frame 4 | 27 | 10 |
| Frame 5 | 35 | 13 |

In an alternative embodiment, a curve may be drawn to connect the positions of the points of interest with a smoothening technique. FIG. 8B illustrates that the normal motion of a point of interest may be nonlinear. For example, in graph 850, the combined motion is represented by line 860, while the normal motion is represented by curve 870. The tracked position 880 of the point of interest in the second frame (labeled "Frame 2") differs from the ideal position of the point of interest 890.

Once the motion trajectories are drawn (block 427), each frame in a group of pictures is again examined. Block 428 represents the video stabilization system 130 selecting the next frame in the current group of pictures, starting with the first frame. Block 432 represents the video stabilization system 130 computing ideal positions of each point in a frame according to motion trajectories.

Image stabilization is completed by computing transform parameters from motion trajectories (block 434) for each frame and by transforming the current frame by moving points from current positions to ideal positions (block 436) using the transform parameters. Then, the transformed frame is output (block 438).

The transform parameters are calculated using affine transformation. For more information on affine transformation, see "Computer Graphics Principles and Practice," by James D. Foley, Andries van Dam, Steven K. Feiner, and John F. Hughes, Second Edition, Addison-Wesley Publishing Company, page 207, 1990; "Affine Transformation," pages 1–8, which was available for download from the website of the School of Informatics at the University of Edinburgh on Oct. 25, 2001; and "Affine Transform Matrices," pages 1–7, which was available for download from the website of the Libart Library on Oct. 25, 2001; each of which is incorporated herein by reference in its entirety.

A matrix is used to solve the transform parameters "a," "b," "c," "d," "m," and "n" for the ideal positions of points of interest (x', y') and the tracked positions of points of interest (x, y). The ideal positions of points of interest (x', y'), are determined by the video stabilization system 130 in block 432 (e.g., see Table E). The tracked positions of points of interest (x, y) are determined by the video stabilization system 130 in block 420 (e.g., see Table D). An image being recorded may be represented using an X, Y coordinate graph. The transform parameters "a," "b," "c," and "d" represent rotation, scaling, and/or shearing information, while the transform parameters "m" and "n" represent translation information. Once the transform parameter values are obtained for the points of interest, these values are applied to all pixels in the frame. The result is a frame in which unwanted motion has been removed.

A general affine transformation maybe written as Equation (1):

$$\begin{pmatrix} x' \\ y' \end{pmatrix} = \begin{pmatrix} a & b \\ c & d \end{pmatrix} \begin{pmatrix} x \\ y \end{pmatrix} + \begin{pmatrix} m \\ n \end{pmatrix} \quad (1)$$

For example, in order to transform a tracked position of a point of interest such as (11, 8) to an ideal position of the point of interest (11, 5), the transform parameters are calculated using equation (2).

$$\begin{pmatrix} 11' \\ 5' \end{pmatrix} = \begin{pmatrix} a & b \\ c & d \end{pmatrix} \begin{pmatrix} 11 \\ 8 \end{pmatrix} + \begin{pmatrix} m \\ n \end{pmatrix} \quad (2)$$

Equation (1) may be written with pairs of equations (3) for three pairs of points of interest. Each pair of points of interest includes a tracked position of the point of interest (e.g., $(x_1, y_1)$) and an ideal position of the point of interest (e.g., $(x'_1, y'_1)$).

$$x'_1 = ax_1 + by_1 + m$$

$$y'_1 = cx_1 + dy_1 + n$$

$$x'_2 = ax_2 + by_2 + m$$

$$y'_2 = cx_2 + dy_2 + n$$

$$x'_3 = ax_3 + by_3 + m$$

$$y'_3 = cx_3 + dy_3 + n \quad (3)$$

For example, for tracked position of a point of interest such as (11, 8) and ideal position of the point of interest (11, 5), equations (4) may be used to solve for the transform parameters:

$$11 = 11a + 8b + m$$

$$5 = 11c + 8d + n \quad (4)$$

The pairs of equations (3) may be rewritten as equation (5):

$$\underbrace{\begin{pmatrix} x_1 & y_1 & 0 & 0 & 1 & 0 \\ 0 & 0 & x_1 & y_1 & 0 & 1 \\ x_2 & y_2 & 0 & 0 & 1 & 0 \\ 0 & 0 & x_2 & y_2 & 0 & 1 \\ x_3 & y_3 & 0 & 0 & 1 & 0 \\ 0 & 0 & x_3 & y_3 & 0 & 1 \\ x_4 & y_4 & 0 & 0 & 1 & 0 \\ 0 & 0 & x_4 & y_4 & 0 & 1 \\ x_5 & y_5 & 0 & 0 & 1 & 0 \\ 0 & 0 & x_5 & y_5 & 0 & 1 \\ \vdots & & & & & \end{pmatrix}}_{M} \begin{pmatrix} a \\ b \\ c \\ d \\ m \\ n \end{pmatrix} = \underbrace{\begin{pmatrix} x'_1 \\ y'_1 \\ x'_2 \\ y'_2 \\ x'_3 \\ y'_3 \\ x'_4 \\ y'_4 \\ x'_5 \\ y'_5 \\ \vdots \end{pmatrix}}_{b} \quad (5)$$

Linear equation (5) may be written as equation (6) as follows:

$$Ma = b \quad (6)$$

The matrix M contains x rows and y columns. If the number of rows exceeds the number of columns, then a linear equation is referred to as over-constrained. For example, for more than three points of interest, there is an over-constrained linear system illustrated in equation (5), which is rewritten as equation (6). The solution to over-constrained equation (5) may not exist in an algebraic sense, but it is valuable to determine a solution in an approximate sense. The error in this approximate solution is then illustrated with equation (7):

$$E = Ma - b \quad (7)$$

In one embodiment, the approximate solution is selected by optimizing this error in some manner. One useful technique for optimizing this error is referred to as the least squares method. For more information about the least squares method, see, for example, "The Method of Least Squares," which was available for download from the website of eFunda on Oct. 25, 2001, which is incorporated herein by reference in its entirety. The least squares method minimizes the residual sum of squares (rss), which is represented as equations (8)–(10) follows:

$$rss = e^T e \quad (8)$$

$$= [a^T M^T b^T][Mab] \quad (9)$$

$$= a^T M^T M a\ 2\ a^T M^T b + b^T b \quad (10)$$

Setting the partial derivative of rss with respect to a (i.e., $\partial rss/\partial a$) to zero gives equation (11):

$$\partial rss/\partial a = 2M^T M a - 2M^T b = 0 \quad (11)$$

Thus, solving for $M^T Ma = M^T b$ or $a = (M^T M)^{-1} M^T b$, the solution vector "a" provides the solution of $Ma = b$ according to the least squares method. Note that $M^{-1}$ represents inversion of matrix M, while $M^T b$ represents transposition.

For example, for tracked position of a point of interest such as (11, 8) and ideal position of the point of interest (11, 5), the video stabilization system 130 may apply the least squares method to determine that the transform parameter values are: a=1, b=0, c=0, d=1, m=0, and n=−3.

For each frame all image elements are then transformed to their ideal positions (block 436). In particular, the values of "a," "b," "c," "d," "m," and "n," which provide rotation, scaling, shearing, and/or translation information (referred to as transformation information), are applied to each pixel of a frame. The result is a frame in which unwanted motion has been removed. Equation (12) may then be used for each pixel in the first frame, represented as (xf, yf), to obtain its position in the second frame, represented as (xs, ys). In one embodiment, the first frame and the second frame are consecutive frames.

$$\begin{pmatrix} xs \\ ys \end{pmatrix} = \begin{pmatrix} 1 & 0 \\ 0 & 1 \end{pmatrix}\begin{pmatrix} xf \\ yf \end{pmatrix} + \begin{pmatrix} 0 \\ -3 \end{pmatrix} \quad (12)$$

Continuing with FIG. 4B, block 440 represents the video stabilization system 130 determining whether all frames in the group of pictures have been selected. If so, processing continues to block 402. Otherwise, the next frame is selected and processing continues to block 428.

In an alternative embodiment, frame averaging and/or frame sharpening may be performed after block 402 and/or after block 436 to remove noise and detect more interesting points of interest. In particular, some details in a video segment may be unclear due to noise, motion blur, and other distortions. Frame averaging may be used to combine data across frames when a scene is relatively stationary to about one pixel or less of variation across several frames at a time. After frame averaging, some degree of blur may remain (e.g., the stabilized frames are imperfectly aligned with one another). Frame sharpening refers to using a sharpen filter to remove this blur. Some additional fine tuning to adjust brightness offset may also be used in yet other alternative embodiments.

Noise in an image usually refers to the pixels whose values are not related to (i.e., not part of) ideal image content. For example, a recorded image may show reflection of sunlight, which is "noise" that may be removed. Since most of the image noise is related to single points, frame averaging can reduce the effect of noise, while frame sharpening can increase image contrast. The result of frame averaging and frame sharpening provides an image in which it is easier to detect real feature points. In particular, if an image has a lot of noise, some techniques for finding feature points may select some points that are not actually features.

Microsoft and Windows 2000 are trademarks of Microsoft, Inc. of Redmond, Wash.

Although the invention has been described with reference to particular embodiments, the description is only an example of the invention's application and should not be taken as a limitation.

Additionally, the invention may be tangibly embodied as software in a computer-readable device or media, such as memory, data storage devices, and/or data communication devices, thereby making a product or article of manufacture according to the invention. As such, the terms "article of manufacture" and "computer program product" and "computer-readable storage medium" as used herein are intended to encompass software accessible from any computer readable device or media. Using the present specification, the invention may be implemented as a machine, process, or article of manufacture by using programming and/or engineering techniques to produce software, firmware, hardware, or any combination thereof.

Various other adaptations and combinations of features of the embodiments disclosed are within the scope of the invention as defined by the claims.

The invention claimed is:

1. A method for stabilizing motion in a sequence of frames, comprising:
   retrieving a group of pictures from the sequence of frames, the group of pictures comprising more than two images;
   identifying a plurality of features in a first frame in the group of pictures;
   determining tracked positions for the features in remaining frames in the group of pictures based on the features in the first frame;
   after said determining tracked positions, determining ideal positions for the features in the remaining frames in the group of pictures based on the tracked positions, said determining ideal positions comprises, for each feature:
      plotting its position from the first frame and its tracked positions from the remaining frames in an X, Y coordinate graph; and
      drawing a motion trajectory that connects a first plotted position from the first frame to a last plotted position from a last frame in the group of pictures, wherein the ideal positions are located on the motion trajectory;

identifying transformation information based on the tracked positions and the ideal positions;

transforming the remaining frames in the group of pictures by adjusting pixels in the remaining frames based on the transformation information; and repeating for remaining groups of pictures in the sequence of frames.

2. The method of claim 1, further comprising:

determining whether the sequence of frames was recorded with fast camera motion or slow camera motion.

3. The method of claim 2, wherein said determining tracked positions comprises:

when it is determined that the sequence of frames was recorded with fast camera motion, performing matching to determine estimated positions for the features in a second frame in the group of pictures.

4. The method of claim 3, wherein said performing matching comprises:

identifying new features in the second frame; and matching the features in the first frame to the new features in the second frame.

5. The method of claim 3, wherein said determining tracked positions further comprises:

when it is determined that the sequence of frames was recorded with slow camera motion, performing global tracking to determine the estimated positions for the features in the second frame.

6. The method of claim 5, wherein said performing global tracking comprises:

searching a plurality of large areas in the second frame to determine the estimated positions for the features in the second frame, the large areas being centered at positions in the second frame that correspond to positions of the features in the first frame.

7. The method of claim 6, wherein said determining tracked positions further comprises:

performing local tracking based on the estimated positions of the features in the second frame to determine the tracked positions of the features in the second frame, wherein said performing local tracking comprises searching a plurality of small areas in the second frame to determine the tracked positions of the features in the second frame, the small areas being centered at the estimated positions of the features in the second frame.

8. The method of claim 1, wherein said drawing a motion trajectory comprises drawing a linear motion trajectory.

9. The method of claim 1, wherein said drawing a motion trajectory comprises drawing a non-linear motion trajectory.

10. The method of claim 1, wherein an ideal position for a feature has a same X-coordinate and a different Y-coordinate as compared to a tracked position for the feature.

11. The method of claim 1, wherein the transformation information comprises rotation, scaling, shearing, and/or translation information for each pixel of the remaining frames in the group of pictures.

12. The method of claim 11, wherein said transforming the remaining frames comprises:

adjusting each pixel in each frame based on the rotation, scaling, shearing, and/or translation information.

13. The method of claim 1, wherein said transforming the remaining frames in the group of pictures comprises:

performing affine transformation using the tracked positions and the ideal positions.

14. The method of claim 13, wherein said performing affine transformation comprises:

determining values of coefficients representing rotation, scaling, shearing, and/or translation information using the tracked positions and the ideal positions.

15. The method of claim 14, wherein said performing affine transformation further comprises:

applying the values of the coefficients to each pixel of the first frame to obtain positions of each pixel in a second frame in the group of pictures.

16. The method of claim 1, further comprising:

performing frame averaging.

17. The method of claim 1, further comprising:

performing frame sharpening.

18. A system, comprising:

a computer including a processor and a memory;

a sequence of frames stored in the memory;

a program stored in the memory of the computer, wherein the program is executed by the processor of the computer to:

retrieve a group of pictures from the sequence of frames, the group of pictures comprising more than two images;

identify a plurality of features in a first frame in the group of pictures;

determine tracked positions for the features in remaining frames in the group of pictures based on the features in the first frame;

after said determine tracked positions, determine ideal positions for the features in the remaining frames in the group of pictures based on the tracked positions, said determine ideal positions comprises, for each feature:

plotting its position from the first frame and its tracked positions from the remaining frames in an X, Y coordinate graph; and drawing a motion trajectory that connects a first plotted position from the first frame to a last plotted position from a last frame in the group of pictures, wherein the ideal positions are located on the motion trajectory;

identify transformation information based on the tracked positions and the ideal positions;

transform the remaining frames in the group of pictures by adjusting pixels in the remaining frames based on the transformation information; and repeat for remaining groups of pictures in the sequence of frames.

19. The system of claim 18, further comprising:

a video camera for recording the sequence of frames.

20. The system of claim 19, wherein the program is executed by the processor of the computer to further:

determine whether the sequence of frames was recorded with fast camera motion or slow camera motion.

21. The system of claim 20, wherein said determine tracked positions comprises:

when it is determined that the sequence of frames was recorded with fast camera motion, performing matching to determine estimated positions for the features in a second frame in the group of pictures.

22. The system of claim 21, wherein said performing matching further comprises:

identifying new features in the second frame; and matching the features in the first frame to the new features in the second frame.

23. The system of claim 21, wherein said determine tracked positions further comprises:

when it is determined that the sequence of frames was recorded with slow camera motion, performing global tracking to determine the estimated positions for the features in the second frame.

24. The system of claim 23, wherein said performing global tracking comprises:
searching a plurality of large areas in the second frame to determine the estimated positions for the features in the second frame, the large areas being centered at positions in the second frame that correspond to positions of the features in the first frame.

25. The system of claim 24, wherein said determine tracked positions further comprises:
performing local tracking based on the estimated positions of the features in the second frame to determine the tracked positions of the features in the second frame, wherein said performing local tracking comprises searching a plurality of small areas in the second frame to determine the tracked positions of the features in the second frame, the small areas being centered at the estimated positions of the features in the second frame.

26. The system of claim 18, wherein said drawing a motion trajectory comprises drawing a linear motion trajectory.

27. The system of claim 18, wherein said drawing a motion trajectory comprises drawing a non-linear motion trajectory.

28. The system of claim 18, wherein said transform the remaining frames in the group of pictures comprises:
performing affine transformation using the tracked positions and the ideal positions.

29. The system of claim 28, wherein said performing affine transformation comprises:
determining values of coefficients representing rotation, scaling, shearing, and/or translation information using the tracked positions and the ideal positions.

30. The system of claim 29, wherein said performing affine transformation further comprises:
applying the values of the coefficients to each pixel of the first frame to obtain positions of each pixel in a second frame in the group of pictures.

31. The system of claim 29, wherein execution of the program further comprises:
performing frame averaging; and
performing frame sharpening.

32. A system, comprising:
a camera;
a sequence of frames captured by the camera;
a computer with a processor and a memory, wherein the sequence of frames is stored in the memory of the computer;
means for determining a position of a feature in a first frame in a group of pictures in the sequence of frames, the group of pictures comprising more than two frames;
means for identifying estimated positions of the feature in remaining frames in the group of pictures;
means for performing local tracking to obtain tracked positions for the feature in the remaining frames based on the estimated positions;
means for determining ideal positions for the feature in the remaining frames based on the tracked positions after said performing local tracking, said determining ideal positions comprises:
plotting the position from the first frame and the tracked positions from the remaining frames in an X, Y coordinate graph;
drawing a motion trajectory that connects a first plotted position from the first frame to a last plotted position from a last frame in the group of pictures, wherein the ideal positions are located on the motion trajectory;
means for identifying transformation information based on the tracked positions and the ideal positions of the feature in the remaining frames; and
means for transforming the remaining frames by adjusting pixels in the remaining frames based on the transformation information.

33. The system of claim 32, further comprising:
means for, when it is determined that the sequence of frames was recorded with fast camera motion, performing matching to identify the estimated positions of the feature in the remaining frames.

34. The system of claim 32, further comprising:
means for, when it is determined that the sequence of frames was recorded with slow camera motion, performing global tracking to identify the estimated positions of the feature in the remaining frames.

35. The system of claim 32, wherein the transforming information comprises rotation, scaling, shearing, and/or translation information for each pixel of a frame.

36. A computer readable storage medium encoded with software instructions, wherein execution of the instructions comprises:
retrieving a group of pictures from the sequence of frames, the group of pictures comprising more than two images;
identifying a plurality of features in a first frame in the group of pictures;
determining tracked positions for the features in remaining frames in the group of pictures based on the features in the first frame;
after said determining tracked positions, determining ideal positions for the features in the remaining frames in the group of pictures based on the tracked positions, said determining ideal positions comprises, for each feature:
plotting its position from the first frame and its tracked positions from the remaining frame in an X, Y coordinate graph; and
drawing a motion trajectory that connects a first plotted position from the first frame to a last plotted position from a last frame in the group of pictures, wherein the ideal positions are located on the motion trajectory;
identifying transformation information based on the tracked positions and the ideal positions;
transforming the remaining frames in the group of pictures by adjusting pixels in the remaining frames based on the transformation information; and
repeating for remaining groups of pictures in the sequence of frames.

37. The computer readable storage medium of claim 36, wherein execution of the instructions further comprises:
determining whether the sequence of frames was recorded with fast camera motion or slow camera motion.

38. The computer readable storage medium of claim 37, wherein said determining tracked positions comprises:
when it is determined that the sequence of frames was recorded with fast camera motion, performing matching to determine estimated positions for the features in a second frame in the group of pictures.

39. The computer readable storage medium of claim 38, wherein said performing matching comprises:

identifying new features in the second frame; and matching the features in the first frame to the new features in the second frame.

40. The computer readable storage medium of claim 38, wherein said determining tracked positions further comprises:

when it is determined that the sequence of frames was recorded with slow camera motion, performing global tracking to determine the estimated positions for the feature in the second frame in the group of pictures.

41. The computer readable storage medium of claim 40, wherein said performing global tracking comprises:

searching a plurality of large areas in the second frame to determine the estimated positions for the features in the second frame, the large areas being centered at positions in the second frame that correspond to positions of the features in the first frame.

42. The computer readable storage medium of claim 41, wherein said determining tracked positions further comprises:

performing local tracking based on the estimated positions of the features in the second frame to determine the tracked positions of the features in the second frame, wherein said performing local tracking comprises searching a plurality of small areas in the second frame to determine the tracked positions of the features in the second frame, the small areas being centered at the estimated positions of the features in the second frame.

43. The computer readable storage medium of claim 36, wherein the transformation information comprises rotation, scaling, shearing, and/or translation information for each pixel of the remaining frames in the group of pictures.

44. The computer readable storage medium of claim 36, wherein said transforming the remaining frames in the group of pictures comprises:

performing affine transformation using the tracked positions and the ideal positions.

45. The computer readable storage medium of claim 44, wherein said performing affine transformation comprises:

determining values of coefficients representing rotation, scaling, shearing, and/or translation information using the tracked positions and the ideal positions.

46. The computer readable storage medium of claim 36, wherein said performing affine transformation further comprising:

applying the values of the coefficients to each pixel of the first frame to obtain positions of each pixel in a second frame in the group of pictures.

47. The method of claim 4, wherein said matching the features in the first frame to the new features in the second frame comprises:

determining a distance histogram and a direction histogram to neighboring features within an area of each of the features in the first frame and the new features in the second frame; and determining correspondences between the features in the first frame and the new features in the second frame by comparing their distance and direction histograms.

48. The method of claim 47, wherein said searching a plurality of large areas comprises:

determining correspondences between the positions of the features in the first frame and the estimated positions of the features in the second frame by comparing values of neighboring pixels of each feature in the first frame with values of neighboring pixels centered about each pixel in a corresponding large area in the second frame.

49. The method of claim 48, wherein said searching a plurality of small areas comprises:

determining correspondences between the features in the first frame and the features at the estimated positions in the second frame by comparing values of neighboring pixels of each feature in the first frame with values of neighboring pixels centered about each pixel in a corresponding small area in the second frame.

\* \* \* \* \*